(12) United States Patent
Nagata et al.

(10) Patent No.: US 9,313,014 B2
(45) Date of Patent: Apr. 12, 2016

(54) RADIO COMMUNICATION SYSTEM, RADIO COMMUNICATION METHOD, RADIO BASE STATION APPARATUS AND USER TERMINAL

(75) Inventors: Satoshi Nagata, Tokyo (JP); Tetsushi Abe, Tokyo (JP); Yoshihisa Kishiyama, Tokyo (JP); Kazuaki Takeda, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 164 days.

(21) Appl. No.: 14/234,438

(22) PCT Filed: Jul. 26, 2012

(86) PCT No.: PCT/JP2012/068925
§ 371 (c)(1),
(2), (4) Date: Feb. 4, 2014

(87) PCT Pub. No.: WO2013/018639
PCT Pub. Date: Feb. 7, 2013

(65) Prior Publication Data
US 2014/0140316 A1    May 22, 2014

(30) Foreign Application Priority Data
Jul. 29, 2011 (JP) .................. 2011-167567

(51) Int. Cl.
*H04W 72/00* (2009.01)
*H04L 5/00* (2006.01)
*H04J 11/00* (2006.01)
*H04B 7/02* (2006.01)

(52) U.S. Cl.
CPC ........... *H04L 5/0091* (2013.01); *H04J 11/0053* (2013.01); *H04L 5/001* (2013.01); *H04L 5/0035* (2013.01); *H04L 5/0053* (2013.01); *H04B 7/024* (2013.01)

(58) Field of Classification Search
CPC ..... H04L 5/001; H04L 5/0053; H04L 5/0094; H04W 72/042; H04W 72/1289
USPC .......................................... 370/329, 328, 241
See application file for complete search history.

(56) References Cited

U.S. PATENT DOCUMENTS 8,280,389 B1 * 10/2012 Turtinen ............... H04W 24/10
455/450
8,780,833 B2 * 7/2014 Kim ........................ H04L 5/001
370/329

(Continued)

OTHER PUBLICATIONS

Decision to Grant a Patent in corresponding Japanese application No. 2013-526854, mailed Aug. 26, 2014 (4 pages).

(Continued)

*Primary Examiner* — Dang Ton
*Assistant Examiner* — Sai Aung
(74) *Attorney, Agent, or Firm* — Osha Liang LLP

(57) ABSTRACT

The present invention is designed to apply CoMP transmission/reception flexibly in a system band that is formed with a plurality of fundamental frequency blocks, improve received quality in user terminals, and also widen the system band. A first radio base station apparatus (20A) that transmits downlink data to a user terminal (10) using a plurality of cells that respectively correspond to fundamental frequency blocks of varying frequency bands, and a second radio base station apparatus (20B) that transmits downlink data to the user terminal (10) using a cell that corresponds to fundamental frequency block of the same frequency band as one of a plurality of cells are provided, and the first radio base station apparatus (20A) and the second radio base station apparatus (20B) perform coordinated multiple-point transmission for the user terminal 10 between cells corresponding to the same fundamental frequency block, and also report information about the combination of cells that perform the coordinated multiple-point transmission to the user terminal (10).

11 Claims, 13 Drawing Sheets

(56) References Cited

U.S. PATENT DOCUMENTS

| | | | | |
|---|---|---|---|---|
| 8,843,168 | B2* | 9/2014 | Wang | H04L 5/003 370/241 |
| 2011/0170496 | A1* | 7/2011 | Fong | H04L 5/0053 370/329 |
| 2011/0312328 | A1* | 12/2011 | Choi | H04L 5/0062 455/450 |
| 2012/0063321 | A1* | 3/2012 | Chandrasekhar | H04L 1/1896 370/241 |
| 2012/0230272 | A1* | 9/2012 | Kim | H04L 1/1861 370/329 |
| 2013/0051355 | A1* | 2/2013 | Hong | H04J 11/0073 370/329 |
| 2013/0058245 | A1* | 3/2013 | Van Lieshout | H04W 36/0083 370/252 |
| 2013/0094456 | A1* | 4/2013 | Ng | H04L 5/0091 370/329 |
| 2013/0201930 | A1* | 8/2013 | Okino | H04W 72/1289 370/329 |

OTHER PUBLICATIONS

International Search Report for corresponding International Application No. PCT/JP2012/068925, mailed Sep. 4, 2012 (1 page).

Nokia Siemens Networks et al.; "Cell aggregation: A unified approach to CoMP and carrier aggregation;" 3GPP TSG-RAN WG1 Meeting #65, R1-111737; Barcelona, Spain; May 9-13, 2011 (3 pages).

3GPP TR 25.912 V7.1.0; "3rd Generation Partnership Project; Technical Specification Group Radio Access Network; Feasibility study for evolved Universal Terrestrial Radio Access (UTRA) and Universal Terrestrial Radio Access Network (UTRAN) (Release 7);" Sep. 2006 (57 pages).

Office Action in counterpart Japanese Patent Application No. 2013-526854, mailed Jun. 10, 2014 (3 pages).

* cited by examiner

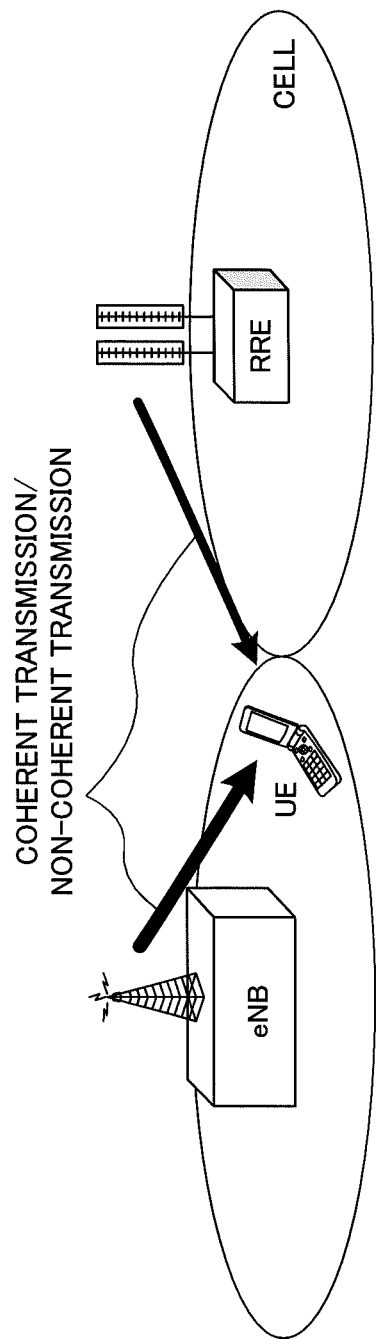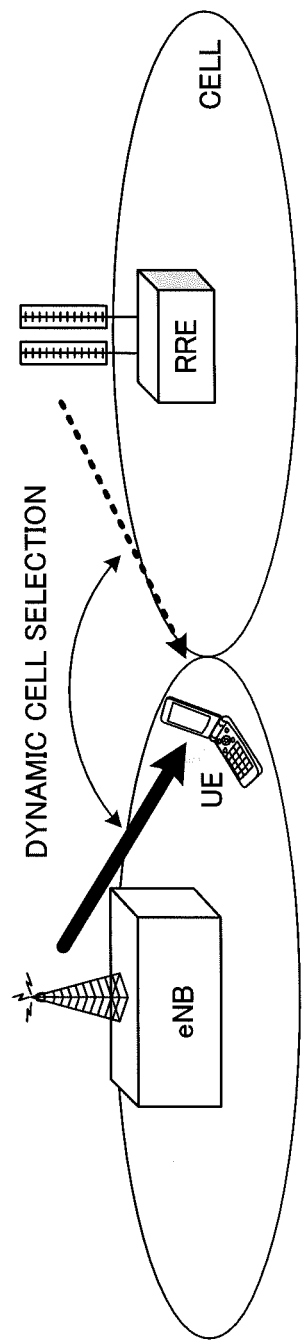
FIG. 1A
FIG. 1B

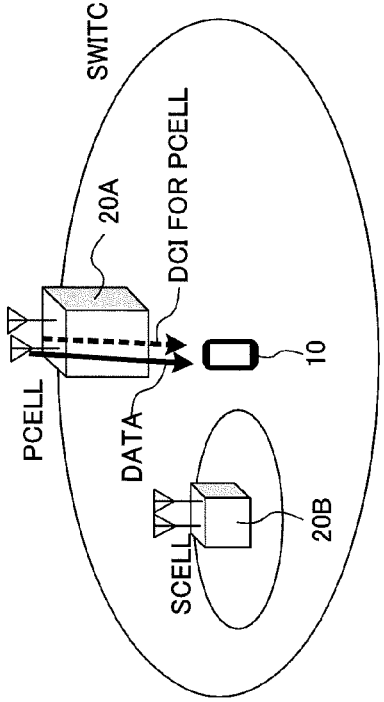
FIG. 6A
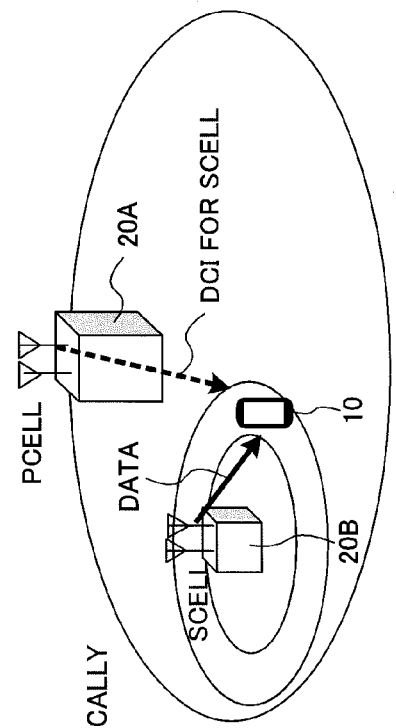
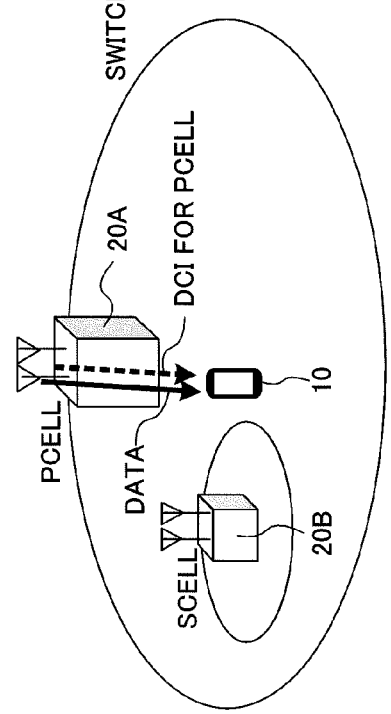
FIG. 6B
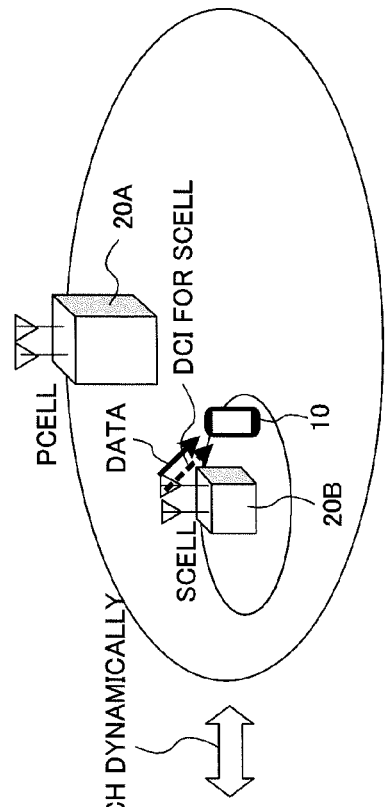

RADIO COMMUNICATION SYSTEM, RADIO COMMUNICATION METHOD, RADIO BASE STATION APPARATUS AND USER TERMINAL

TECHNICAL FIELD

The present invention relates to a radio communication system, a radio communication method, a radio base station apparatus and a user terminal. More particularly, the present invention relates to a radio communication system, a radio communication method, a radio base station apparatus and a user terminal that perform coordinated multiple point (CoMP) transmission/reception in a system band that is formed by aggregating a plurality of fundamental frequency blocks.

BACKGROUND ART

In a UMTS (Universal Mobile Telecommunications System) network, system features that are based on W-CDMA (Wideband Code Division Multiple Access) are maximized by adopting HSDPA (High Speed Downlink Packet Access) and HSUPA (High Speed Uplink Packet Access) for the purposes of improving the spectral efficiency and improving the data rate. For this UMTS network, long-term evolution (LTE) has been under study (non-patent literature 1) for the purposes of further increasing high-speed data rates, providing low delay and so on.

In the third-generation system, it is possible to achieve a transmission rate of maximum approximately 2 Mbps on the downlink by using a fixed band of approximately 5 MHz. Meanwhile, in a system of the LTE scheme, it is possible to achieve a transmission rate of about maximum 300 Mbps on the downlink and about 75 Mbps on the uplink by using a variable band which ranges from 1.4 MHz to 20 MHz. Furthermore, in the UMTS network, for the purpose of achieving further broadbandization and higher speed, successor systems of LTE have been under study (for example, LTE-Advanced (LTE-A system)).

CITATION LIST

Non-Patent Literature

Non-Patent literature 1: 3GPP, TR25.912 (V7.1.0), "Feasibility Study for Evolved UTRA and UTRAN," September 2006

SUMMARY OF THE INVENTION

Technical Problem

In the LTE-A system, aggregating a plurality of fundamental frequency blocks (component carriers (CCs)) of varying frequency bands for broadbandization (carrier aggregation (CA)) is under study. Also, in the LTE-A system, there is an agreement to make the fundamental frequency blocks a frequency band that can be used in the LTE system (for example, 20 MHz), in order to realize broadbandization while maintaining backward compatibility with the LTE system. For example, when five fundamental frequency blocks are aggregated, the system band becomes 100 MHz.

Now, as a promising technique for further improving the system performance of the Rel-8 LTE system, there is inter-cell orthogonalization. In the LTE-A system, intra-cell orthogonalization is made possible by orthogonal multiple access on both the uplink and the downlink. That is to say, on the downlink, orthogonalization is provided between user terminals (user equipment) in the frequency domain. However, between cells, like in W-CDMA, interference randomization by one-cell frequency reuse is fundamental. In the 3GPP (3rd Generation Partnership Project), coordinated multiple-point transmission/reception (CoMP) is under study as a technique to realize inter-cell orthogonalization. In CoMP transmission/reception, a plurality of cells coordinate and perform signal processing for transmission and reception for one user terminal (UE) or for a plurality of user terminals (UEs).

However, in CoMP transmission/reception, it is necessary to apply the same frequency band between cells that perform coordinated multiple-point transmission with respect to a user terminal. When CoMP transmission/reception is applied between cells of different radio base station apparatuses, in a system band that is formed with a plurality of fundamental frequency blocks, the control for CoMP transmission/reception becomes complex. Meanwhile, if CoMP transmission/reception is applied to a configuration to perform data transmission with respect to a single limited fundamental frequency block, although it is possible to improve received quality in user terminals, it then becomes not possible to realize sufficient broadbandization.

The present invention has been made in view of the above, and it is therefore an object of the present invention to provide a radio communication system, a radio communication method, a radio base station apparatus and a user terminal whereby, in a system band that is formed with a plurality of fundamental frequency blocks, it is possible to apply CoMP transmission/reception flexibly, improve received quality in user terminals, and also widen the system band.

Solution to Problem

A radio communication system according to the present invention has: a first radio base station apparatus that transmits downlink data to a user terminal using a plurality of cells that respectively correspond to fundamental frequency blocks of varying frequency bands; and a second radio base station apparatus that transmits downlink data to the user terminal using a cell that corresponds to fundamental frequency block of a same frequency band as one of the plurality of cells, and, in this radio communication system: the user terminal receives the downlink data in a system band that is formed with cells that are selected respectively from the first radio base station apparatus and the second radio base station apparatus; and the first radio base station apparatus and the second radio base station apparatus perform coordinated multiple-point transmission for the user terminal, between the cells corresponding to a same fundamental frequency block, and also report information about a combination of cells that perform the coordinated multiple-point transmission to the user terminal.

Another radio communication system according to the present invention has: a first radio base station apparatus that transmits downlink data to a user terminal using a plurality of cells that respectively correspond to fundamental frequency blocks of varying frequency bands; and a plurality of second radio base station apparatuses that have lower transmission power than the first radio base station apparatus and that also have coverage areas that are each included in a coverage area of the first radio base station apparatus, and, in this radio communication system: the plurality of the second radio base station apparatuses transmit downlink data to the user terminal by performing coordinated multiple-point transmission using cells that correspond to fundamental frequency blocks of a same frequency band; and the user terminal receives the downlink data transmitted from the plurality of the second radio base station apparatuses by coordinated multiple-point transmission.

A radio communication method according to the present invention includes the steps of: at a first radio base station apparatus, transmitting downlink data to a user terminal using a plurality of cells that respectively correspond to fundamental frequency blocks of varying frequency bands; at a second radio base station apparatus, transmitting downlink data to the user terminal using a cell that corresponds to fundamental frequency block of a same frequency band as one of the plurality of cells; and at the user terminal, receiving the downlink data in a system band that is formed with cells that are selected respectively from the first radio base station apparatus and the second radio base station apparatus, and, in this radio communication method, the first radio base station apparatus and the second radio base station apparatus perform coordinated multiple-point transmission for the user terminal, between cells corresponding to a same fundamental frequency block, and also report information about a combination of cells that perform the coordinated multiple-point transmission to the user terminal.

A radio base station apparatus according to the present invention is radio base station apparatus that transmits downlink data to a user terminal using a plurality of cells that respectively correspond to fundamental frequency blocks of varying frequency bands, and this radio base station apparatus has: a transmission control section that executes coordinated multiple-point transmission with the user terminal, between a predetermined cell selected from the plurality of cells, and a cell of another radio base station apparatus corresponding to a fundamental frequency block of a same frequency band as the predetermined cell; and an information generating section that generates information about a combination of cells that perform the coordinated multiple-point transmission.

A user terminal according to the present invention is a user terminal that receives data transmitted from a plurality of radio base station apparatuses using a system band that is formed with a plurality of fundamental frequency blocks, and this user terminal has: a reception control section that receives downlink data that is transmitted from a plurality of radio base station apparatuses by coordinated multiple-point transmission between cells corresponding to fundamental frequency blocks of a same frequency band; and a determining section that demodulates the data transmitted from the plurality of radio base station apparatuses and determines a combination of cells that perform the coordinated multiple-point transmission.

Technical Advantage of the Invention

According to the present invention, it is possible to apply CoMP transmission/reception flexibly, in a system band that is formed with a plurality of blocks, improve received quality in user terminals, and also widen the system band.

BRIEF DESCRIPTION OF DRAWINGS

FIG. 1 provides diagrams to explain coordinated multiple points;
FIG. 6 provides diagrams to show examples of data transmission when dynamic cell selection is adopted in a radio communication system according to the present embodiment.

DESCRIPTION OF EMBODIMENTS

Now, an embodiment of the present invention will be described below in detail with reference to the accompanying drawings. First, downlink CoMP transmission will be described. Downlink CoMP transmission includes coordinated scheduling/coordinated beamforming, and joint processing. Coordinated scheduling/coordinated beamforming refers to a method of transmitting from only one cell to one UE, and allocating radio resources in the frequency/space domain by taking into account interference from other cells and interference against other cells. On the other hand, joint processing refers to simultaneous transmission by a plurality of cells where precoding is applied, and includes joint transmission to transmit from a plurality of cells to one UE as shown in FIG. 1A, and dynamic cell selection to select cells dynamically as shown in FIG. 1B.

Figure 2A:
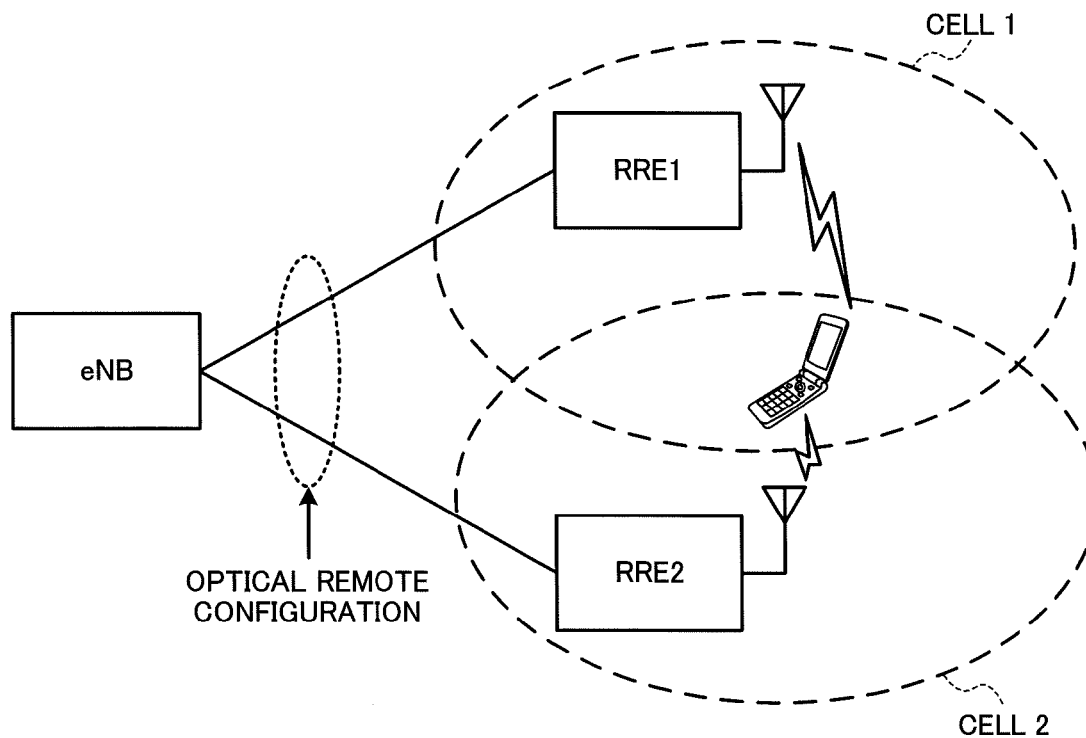
FIG. 2 provides diagrams to explain configurations of radio base station apparatuses.
Figure 2B:
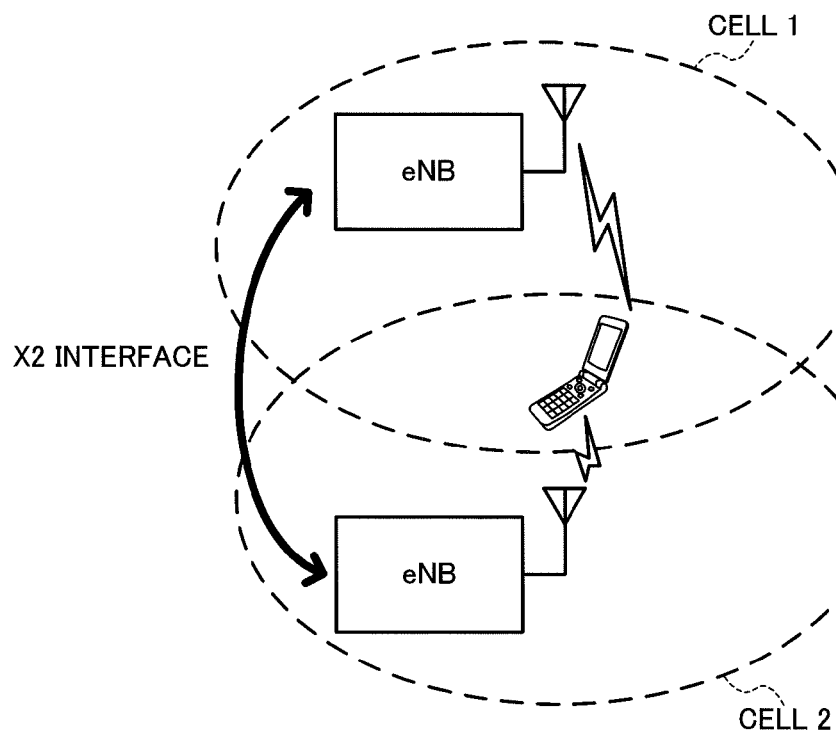

As a configuration to realize CoMP transmission/reception, as shown in FIG. 2A, there are a configuration (centralized control based on a remote radio equipment configuration) to include a radio base station apparatus (radio base station apparatus eNB) and a plurality of remote radio equipment (RREs) that are connected with the radio base station apparatus eNB by an optical remote configuration (optical fiber) and a configuration of a radio base station apparatus (radio base station apparatus eNB) (autonomous distributed control based on an independent base station configuration), as shown in FIG. 2B. The radio communication system and the radio communication method according to, the present embodiment are applicable in either of the above configurations.

In the configuration shown in FIG. 2A (RRE configuration), remote radio equipment RRE 1 and RRE 2 are controlled in a centralized fashion in a radio base station apparatus eNB. In the RRE configuration, the radio base station apparatus eNB (central base station) that performs baseband signal processing and a control for a plurality of RREs, and each cell (that is, RRE), are connected by baseband signals using optical fiber, so that it is possible to execute a radio resource control between cells in the central base station altogether. That is, the problems of signaling delay and overhead between radio base station apparatuses, which become problems in an independent base station configuration, are insignificant, and a high-speed radio resource control between cells becomes relatively easy. Consequently, in the RRE configuration, on the downlink, it is suitable for adopting a method to use fast signal processing between cells such as simultaneous transmission by a plurality of cells.

On the other hand, in the configuration shown in FIG. 2B, a radio resource allocation control such as scheduling is performed in each of a plurality of radio base station apparatus eNBs (or RREs). In this case, by using the X2 interface between the radio base station apparatus eNB of cell 1 and the radio base station apparatus eNB of cell 2, radio resource allocation information such as timing information and scheduling is transmitted to one of the radio base station apparatuses when necessary, thereby coordinating between the cells.

Next, carrier aggregation (CA) to form a system band by aggregating a plurality of fundamental frequency blocks will be described.

Figure 3:
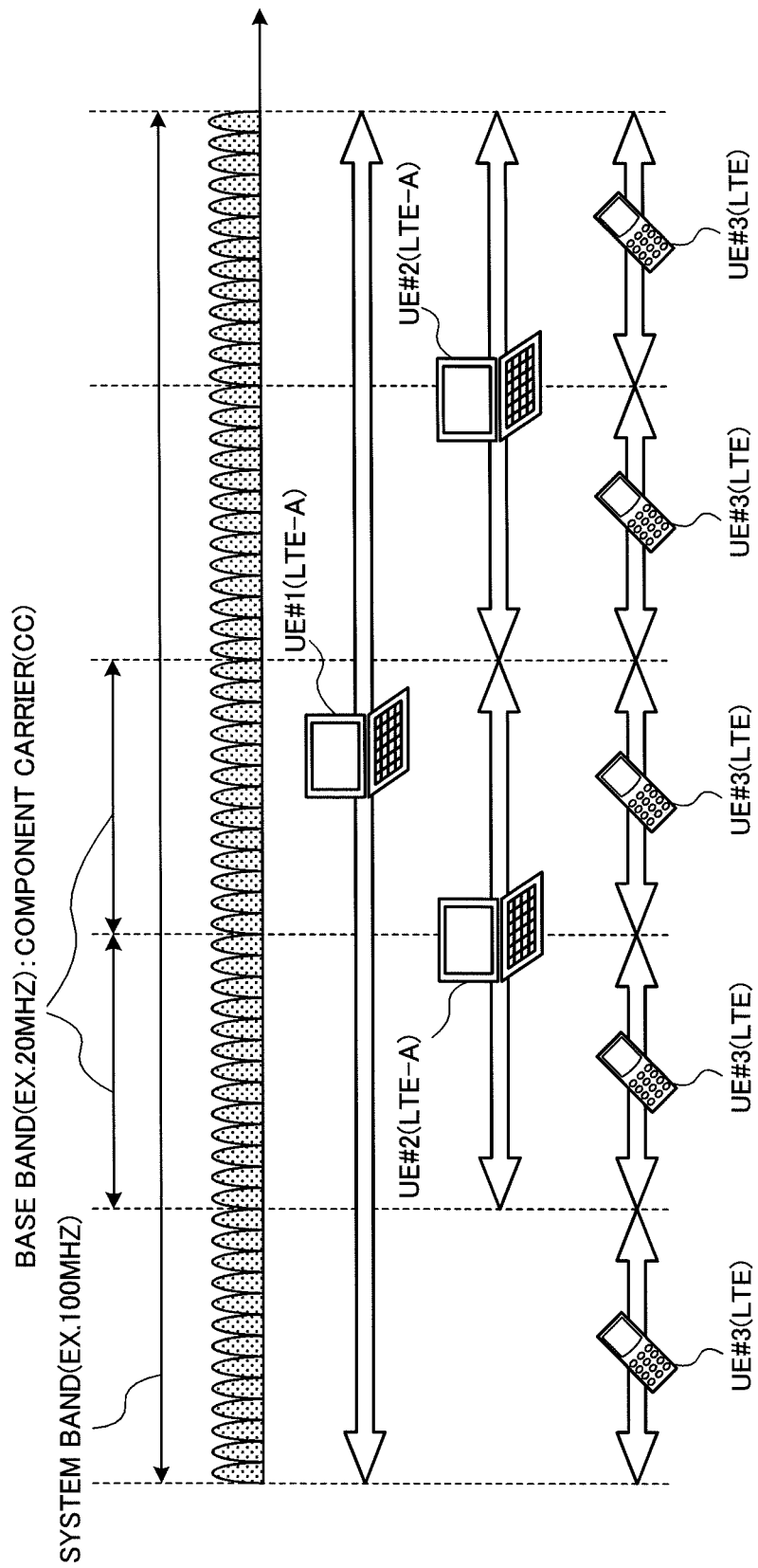
FIG. 3 is a diagram showing a layered bandwidth configuration defined in LTE-A.

FIG. 3 is a diagram showing a layered bandwidth configuration defined in LTE-A. The example shown in FIG. 3 illustrates a layered bandwidth configuration where an LTE system to perform radio communication using a variable system band and an LTE-A system to perform radio communication using a variable system band, where the system band can be switched by adding or removing the fundamental frequency blocks, using the system band of the LTE system (for example, the maximum system band) as a fundamental unit (fundamental frequency block) coexist.

In the LTE-A system, for example, radio communication is performed in a variable system bandwidth of 100 MHz or lower, and, in the LTE system, radio communication is performed in a variable system bandwidth of 20 MHz or lower. The system band for the LTE-A system is at least one fundamental frequency block, where the system band of the LTE system is one unit. In LTE-A, a fundamental frequency block is referred to as a "component carrier" (CC).

For example, in FIG. 3, the system band of the LTE-A system can be configured with a system band to include bands of five component carriers (20 MHz×5=100 MHz), where the system band (base band: 20 MHz) of the LTE system is one component carrier. In FIG. 3, user terminal UE #1 is a user terminal to support the LTE-A system (and also support the LTE system), and is able to support a system band up to 100 MHz. UE #2 is a user terminal to support the LTE-A system (and also support the LTE system), and is able to support a system band up to 40 MHz (20 MHz×2=40 MHz). UE #3 is a user terminal to support the LTE system (and not support the LTE-A system), and is able to support a system band up to 20 MHz (base band).

In a system band formed by aggregating a plurality of fundamental frequency blocks (CCs) of varying frequency bands, at least one cell is provided for one fundamental frequency block. Consequently, a radio base station apparatus transmits downlink data in fundamental frequency block units, using a plurality of cells corresponding to respective fundamental frequency blocks. A user terminal receives downlink data in a system band that is formed by cells selected at the radio base station apparatus. In this way, a user terminal performs data transmission with a radio base station apparatus in a plurality of cells corresponding to different fundamental frequency blocks, so that it is possible to realize widening of the system band.

Now, in above-described CoMP transmission/reception, it is necessary to apply the same frequency band between cells that perform coordinated multiple-point transmission to user terminals. When CoMP transmission/reception is adopted in a system band formed with a plurality of fundamental frequency blocks, CoMP transmission/reception is performed between cells that correspond to fundamental frequency blocks of the same frequency band, in different radio base station apparatuses. In this case, each radio base station apparatus has to control the fundamental frequency blocks to select and the fundamental frequency blocks to apply CoMP transmission/reception to, and, furthermore, needs to report such pieces of information to user terminals, and, consequently, the controls in the radio base station apparatuses become complex. On the other hand, when a configuration is employed in which, when CoMP transmission/reception is adopted, data transmission is performed only in a single limited fundamental frequency block, although it is possible to improve received quality in user terminals, it then becomes not possible to achieve sufficient broadbandization.

The present inventor has arrived at conceiving of forming, upon CoMP transmission/reception, a system band by selecting cells that at least correspond to fundamental frequency blocks of the same frequency band from different radio base station apparatuses, and executing coordinated multiple-point transmission between cells corresponding to the same fundamental frequency blocks. To be more specific, the present inventor has arrived at the present invention upon conceiving of executing CoMP transmission/reception using the mechanism of carrier aggregation, by selecting cells from a plurality of radio base station apparatuses and allowing carrier aggregation to use fundamental frequency blocks of the same frequency band.

With the radio communication system according to the present embodiment, upon CoMP transmission/reception, between the first radio base station apparatus and a second radio base station apparatus, a system band is formed with cells that at least correspond to fundamental frequency blocks of the same frequency band, and coordinated multiple-point transmission is executed between cells corresponding to the same fundamental frequency blocks. When this takes place, information about the combinations of cells to perform coordinated multiple-point transmission is reported to user terminals.

Also, upon CoMP transmission/reception, it is possible to control data transmission by making a predetermined cell of the first radio base station apparatus, which serves as a serving point, be the primary cell (Pcell), and the cell of a second radio base station apparatus, which serves as a coordinated cell (CoMP transmission point), be a secondary cell (Scell).

By this means, in a system band formed with a plurality of fundamental frequency blocks, it is possible to apply CoMP transmission/reception flexibly, improve received quality in user terminals, and also widen the system band. Now, the radio communication system according to the present embodiment will be described below in detail.

Figure 4A:
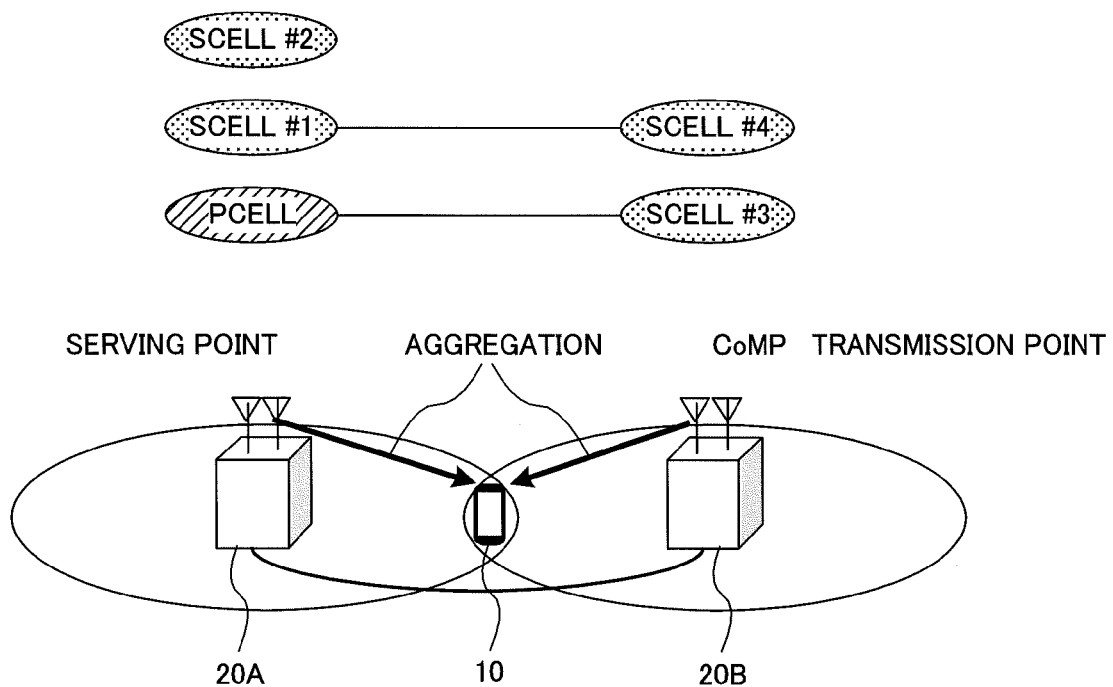
FIG. 4 provides diagrams to show an example of a configuration of a radio communication system according to the present embodiment.
Figure 4B:
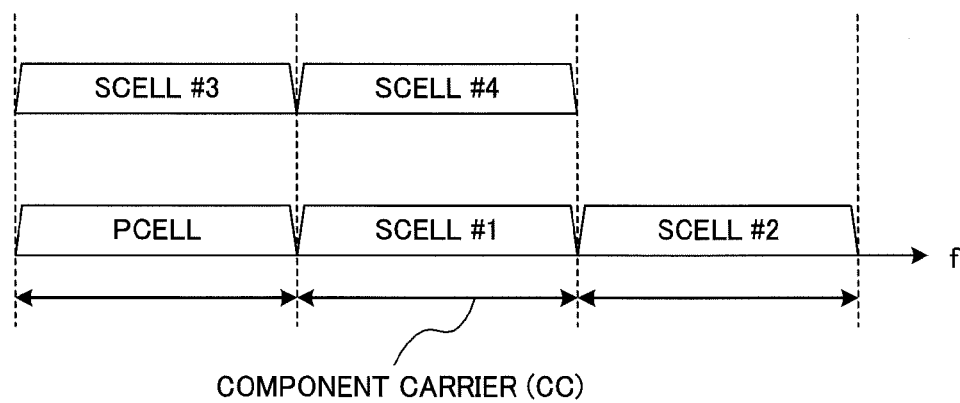

FIG. 4 provides diagrams to show a configuration of a radio communication system according to the present embodiment. FIG. 4A shows a case where a first radio base station apparatus 20A and a second radio base station apparatus 20B perform data transmission with a user terminal 10, from a plurality of cells, in fundamental frequency block units. FIG. 4B shows the relationship between the frequency band of fundamental frequency blocks corresponding to the cells which the first radio base station apparatus 20A uses for downlink data transmission, and the frequency band of fundamental frequency blocks corresponding to the cells which the second radio base station apparatus 20B uses for downlink data transmission.

The first radio base station apparatus 20A transmits downlink data to the user terminal 10 in fundamental frequency block units, using a plurality of cells (three cells, namely Pcell, Scell #1 and Scell #2) corresponding to fundamental frequency blocks of varying frequency bands respectively. Also, the second radio base station apparatus 20B transmits downlink data to the user terminal 10 in fundamental frequency block units, using a plurality of cells (two cells, namely Scell #3 and Scell #4) corresponding to fundamental frequency blocks of varying frequency bands respectively.

Also, the first radio base station apparatus 20A and the second radio base station apparatus 20B perform coordinated multiple-point transmission with the user terminal 10, between cells corresponding to fundamental frequency blocks of the same frequency band (in FIG. 4, between Pcell and Scell #3, and/or between Scell #1 and Scell #4). By this means, even when the user terminal 10 is located on a cell edge, it is still possible to improve received quality in the user terminal 10.

The user terminal 10 receives downlink data in a system band that is formed by aggregating a plurality of fundamental frequency blocks that respectively correspond to a plurality of cells of the first radio base station apparatus 20A (Pcell, Scell #1, Scell #2) and a plurality of cells of the second radio base station apparatus 20B (Scell #3 and Scell #4). That is to say, cells are selected from a plurality of radio base station apparatuses, and carrier aggregation to use fundamental frequency blocks of the same frequency band is allowed. In this case, downlink data that is transmitted by coordinated multiple-point transmission is received from cells corresponding to fundamental frequency blocks of the same frequency band (Pcell and Scell #3, and/or Scell #1 and Scell #4).

As shown in FIG. 4, when forming a system band with a plurality of cells that are selected individually from the first radio base station apparatus 20A and the second radio base station apparatus 20B, one primary cell (Pcell), which is to be defined in carrier aggregation, is selected from a plurality of cells of the first radio base station apparatus 20A and the second radio base station apparatus 20B.

Note that, although FIG. 4 shows a case where the first radio base station apparatus 20A selects three cells (Pcell, Scell #1 and Scell #2) that respectively correspond to three CCs and the second radio base station apparatus 20B selects two cells (Scell #3 and Scell #4) that respectively correspond to two CCs, and where the first radio base station apparatus 20A and the second radio base station apparatus 20B perform data transmission with the user terminal 10 using a system band formed with the selected cells, the numbers and combinations of cells to use are not limited to these.

Also, the first radio base station apparatus 20A and/or the second radio base station apparatus 20B reports information about the combination of cells to execute coordinated multiple-point transmission (here, the combination of Pcell and Scell #3 and/or Scell #1 and Scell #4) to the user terminal 10. The user terminal 10 receives the information about the combination of cells and, by this means, is able to identify the cells performing coordinated multiple-point transmission among a plurality of cells.

The method of reporting cell-combination information may adopt a method of including cell-combination information in downlink control information (DCI) and reporting this to user terminals (dynamic signaling), or may adopt a method of including cell-combination information in higher layer signaling and reporting this to user terminals (semi-static signaling).

When including cell-combination information in downlink control information, it is possible to report this to user terminals on a per subframe basis, so that it is possible to control CoMP transmission/reception dynamically. Meanwhile, from the perspective of reducing the overhead of downlink control channels, it is preferable to adopt higher layer signaling. When adopting higher layer signaling, it is possible to include cell-combination information in, for example, broadcast information, RRC (Radio Resource Control) signaling and so on.

Figure 5A:
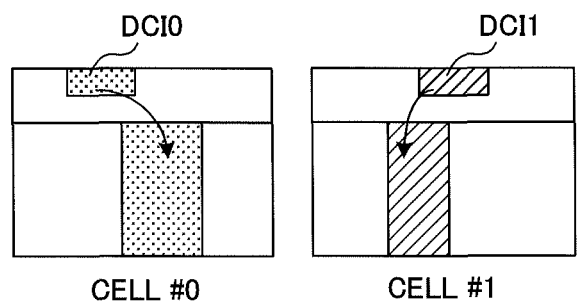
FIG. 5 provides diagrams to show examples of a CIF that is used in cross-carrier scheduling in an LTE-A system.
Figure 5B:
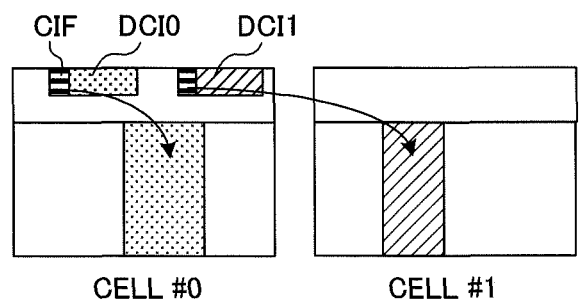

Also, in the radio communication system according to the present embodiment, it is possible to adopt a method of controlling scheduling on a per cell basis, by transmitting, from each cell, separately, downlink control information (DCI) for controlling the demodulation of each cell's downlink data (see FIG. 5A), and a method of controlling scheduling by aggregating and transmitting downlink control information in predetermined cells (cross-carrier scheduling) (see FIG. 5B).

With the method of transmitting downlink control information from each cell separately, as shown in FIG. 5A, downlink control information for controlling the demodulation of the downlink data that is transmitted from each cell, is transmitted from each cell using a PDCCH. In FIG. 5A, downlink control information (DCI 0 and DCI 1) is transmitted separately, from cell #0 and cell #1, using each cell's PDCCH.

With the method of transmitting downlink control information for a plurality of cells from a predetermined cell (cross-carrier scheduling), as shown in FIG. 5B, downlink control information for controlling the downlink data that is transmitted from each cell is transmitted using the PDCCH of a predetermined cell (for example, Pcell). In FIG. 5B, downlink control information (DCI 0 and DCI 1) for cell #0 and cell #1 is transmitted using the PDCCH of cell #0.

In cross-carrier scheduling, it is necessary to identify as to which cell's downlink data the downlink control information that is aggregated and transmitted in the PDCCH of a predetermined cell is to demodulate. Then, a carrier indicator field (CIF) for identifying the cell to which the downlink control information belongs is added to the PDCCH of the predetermined cell. By this means, it is possible to identify the cell to which the allocated PDCCH corresponds, from the bit information constituting the CIF. That is, a common CIF table is shared between the radio base station apparatuses 20A and 20B and the user terminal 10, so that it is possible to specify the cells where the PDSCH is allocated, based on the bit information of the CIF reported from the radio base station apparatuses 20A and 20B. Note that the CIF is agreed to be formed with three bits.

For example, in the radio communication system shown in FIG. 4, when transmitting downlink control information from each cell separately, the first radio base station apparatus 20A and the second radio base station apparatus 20B separately transmit downlink control information using the PDCCH of each cell (Pcell, Scell #1, Scell #2, Scell #3 and Scell #4).

On the other hand, in the radio communication system shown in FIG. 4, with the method of transmitting downlink control information for a plurality of cells from a predetermined cell, the first radio base station apparatus 20A and the second radio base station apparatus 20B transmit downlink control information using the PDCCH of Pcell, instead of transmitting downlink control information from a plurality of cells (Pcell, Scell #1, Scell #2, Scell #3, Scell #4) separately. In this case, as described above, a CIF is attached to the PDCCH of Pcell used to transmit downlink control information.

Note that, instead of aggregating downlink control information of all cells in Pcell, it is equally possible to apply cross-carrier scheduling between cells corresponding to fundamental frequency blocks of the same frequency band, in the first radio base station apparatus 20A and the second radio base station apparatus 20B.

Now, a method of data transmission upon downlink CoMP transmission in the radio communication system according to the present embodiment will be described below in detail. Note that a case will be shown in the following description where the first radio base station apparatus 20A is a macro base station having a relatively large coverage area and the second radio base station apparatus 20B is a micro base station having a relatively narrow coverage area. Each cell's coverage area and the number of radio base station apparatuses are by no means limited to these. Also, although a case will be shown where the coverage area of the first radio base station apparatus 20A includes the coverage area of the second radio base station apparatus 20B, this is by no means limiting, and a configuration in which the coverage areas of the first radio base station apparatus 20A and the second radio base station apparatus 20B partly overlap is also possible.

FIG. 6 provides diagrams to show examples of data transmission when dynamic cell selection to select cells dynamically is adopted in the radio communication system according to the present embodiment. FIG. 6A shows a case of executing cross-carrier scheduling, and FIG. 6B shows a case of transmitting downlink control information from each cell separately.

In FIG. 6A, when a cell (for example, Pcell) which the first radio base station apparatus 20A uses is selected as the cell to communicate with the user terminal 10, the first radio base station apparatus 20A transmits a downlink control signal and downlink data to the user terminal 10 using Pcell.

On the other hand, when a cell (for example, Scell #3) which the second radio base station apparatus 20B uses is selected as the cell to communicate with the user terminal 10, the second radio base station apparatus 20B transmits downlink data to the user terminal 10 using Scell #3. Also, downlink control information to be used to control the demodulation of that downlink data is transmitted from the first radio base station apparatus 20A to the user terminal 10 using Pcell. In this case, a CIF to identify the cell to which the downlink control information belongs is attached to the PDCCH allocated to Pcell.

For example, when the transmission power of the second radio base station apparatus 20B is low compared to the first radio base station apparatus 20A, interference from the first radio base station apparatus 20A increases as the user terminal 10 moves farther from the second radio base station 20B. By this means, at the user terminal 10, the possibility that the downlink control information from the second radio base station apparatus 20B cannot be received correctly increases. In this case, by transmitting downlink control information for demodulating the downlink data of the second radio base station apparatus 20B from the cell of the first radio base station apparatus 20A, it becomes possible to correctly receive downlink control information at the user terminal 10.

In this way, when adopting dynamic cell selection to select cells dynamically and executing cross-carrier scheduling, downlink control information is transmitted from the first radio base station apparatus 20A that performs data transmission using Pcell. When cell-combination information is included in downlink control information and reported to user terminals (dynamic signaling), the cell-combination information is also transmitted from Pcell.

Note that, when the first radio base station apparatus 20A transmits data to the user terminal 10 using other cells (Scell #1 and Scell #2 in FIG. 4) in addition to Pcell, it is possible to execute cross-carrier scheduling between Pcell and Scell #1 and Scell #2, as between Pcell and Pcell #3. In this case, downlink control information to control the downlink data transmitted from Scell #1 and Scell #2 is allocated to the PDCCH of Pcell, and also a CIF is attached to this PDCCH.

Also, as shown in FIG. 6B, when downlink control information is transmitted from each cell, a downlink control signal and downlink data are transmitted to the user terminal 10, from each cell which the first radio base station apparatus 20A and the second radio base station apparatus 20B use. That is to say, downlink control information to control each cell's downlink data is transmitted using each cell's PDCCH. Note that FIG. 6A and FIG. 6B can also be made configurations to execute controls with various adequate changes taking into account the position of the user terminal 10 and so on.

Figure 7A:
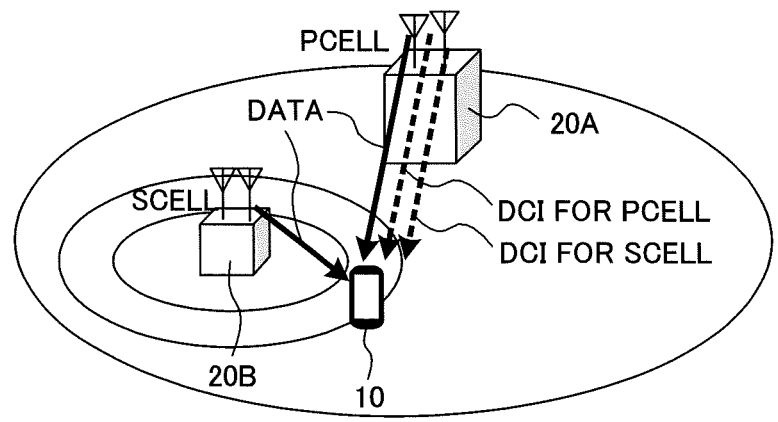
FIG. 7 provides diagrams to show examples of data transmission when joint transmission is adopted in a radio communication system according to the present embodiment.
Figure 7B:
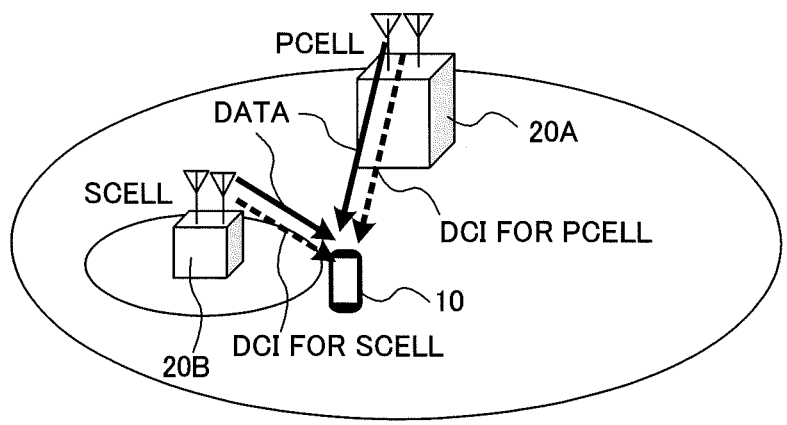

FIG. 7 provides diagram to show examples of data transmission when joint transmission to transmit from a plurality of cells to one UE is adopted in the radio communication system according to the present embodiment. FIG. 7A shows a case of executing cross-carrier scheduling, and FIG. 7B shows a case of transmitting downlink control information from each cell separately.

When cross-carrier scheduling is executed, downlink control information to control downlink data that is transmitted from each cell is transmitted using a predetermined cell (in FIG. 7A, Pcell of the first radio base station apparatus 20A). That is, the first radio base station apparatus 20A transmits a downlink control signal and downlink data to the user terminal 10 using Pcell, and the second radio base station apparatus 20B transmits downlink data to the user terminal 10 using Scell #3.

In this case, the downlink data that is transmitted from Scell #3 is demodulated using the downlink control information that is transmitted using the PDCCH of Pcell. Also, a CIF to identify the cell to which downlink control information belongs is attached to the PDCCH of Pcell.

Also, as shown in FIG. 7B, when downlink control information is transmitted from each cell separately, a downlink control signal and downlink data are transmitted to the user terminal 10 from each cell which the first radio base station apparatus 20A and the second radio base station apparatus 20B use. That is to say, downlink control information to control each cell's downlink data is transmitted using each cell's PDCCH.

Also, when downlink data is transmitted from a plurality of transmission points to one UE (see FIG. 7), it is possible to transmit the same downlink data or transmit different downlink data to the user terminal 10 from different cells that perform multiple-point transmission (for example, Pcell and Scell #3).

When transmitting different downlink data, it is possible to control the allocation of downlink data in resource block units, taking into account the frequency variation (received quality) in each cell. By this means, it becomes possible to improve received quality in the user terminal and also use radio resources effectively.

When transmitting the same downlink data from different cells, it is possible to employ a configuration to selectively transmit downlink control information, in which PDSCH allocation position information and so on are defined, from one cell (for example, Pcell). When transmitting the same downlink data from different cells, it is preferable to transmit from one cell, because the downlink control information of the other cell (for example, Scell #3) is the same information as that of Pcell. Note that, in this case, cell information in which downlink control information to be used to decode downlink data—that is to say, information as to based on which cell's downlink control signal downlink data is to be decoded—is reported to the user terminal 10.

The method of reporting cell information in which downlink control information to be used to decode downlink data may adopt a method of including and reporting in downlink control information to the user terminal (dynamic signaling), or may adopt a method of including and reporting in higher layer signaling to the user terminal 10 (semi-static signaling).

For example, in the radio communication system shown in FIG. 7, when transmitting the same downlink data to the user terminal 10 by coordinated multiple-point transmission between Pcell and Scell #3, downlink control information is transmitted selectively from Pcell, and also information to decode data based on the downlink control information of Pcell is reported. Likewise, when transmitting the same downlink data to the user terminal 10 by coordinated multiple-point transmission between Scell #1 and Scell #4, downlink control information is transmitted selectively from Scell #1, and, based on the downlink control information of Scell #1, information for data decoding is reported.

In this way, when transmitting the same downlink data from different cells, it is possible to allow effective use of radio resources by aggregating and transmitting downlink control information from a predetermined cell.

Figure 8:
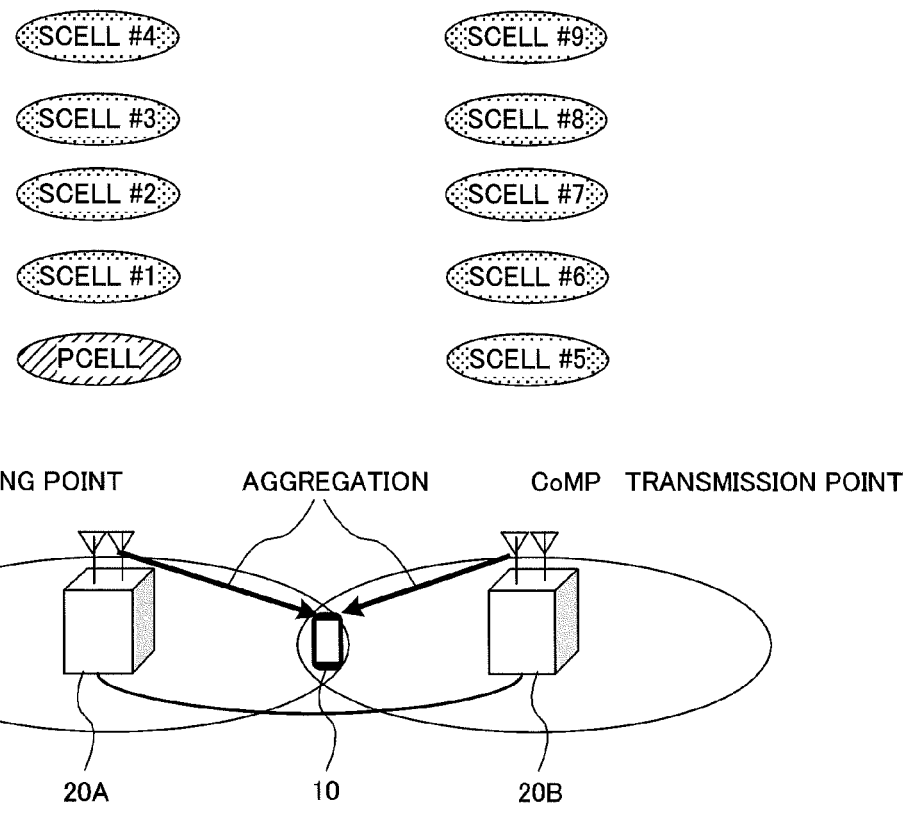
FIG. 8 is a diagram to show a case where CoMP is applied between low transmission power base stations in a radio communication system according to the present embodiment.

Also, in the radio communication system according to the present embodiment, a plurality of cells, which a plurality of radio base station apparatus use respectively, are aggregated, and the system band is formed with CCs that correspond to these cells. Consequently, for example, as shown in FIG. 8, a configuration may be possible in which the first radio base station apparatus 20A and the second radio base station apparatus 20B each use a combination of cells that correspond to five CCs (Pcell, and Scell #1 to Scell #9).

On the other hand, when the method of transmitting downlink control information for a plurality of cells from a predetermined cell is adopted, with the CIF (three bits) that is currently agreed on, there is a threat that it becomes not possible to report, to a user terminal, detailed information about downlink control information corresponding to the downlink data that is transmitted from each cell. As a result of this, there is a threat that a user terminal is unable to demodulate downlink data and is unable to acquire information about the combination of cells that perform coordinated multiple-point transmission and so on.

Consequently, in the radio communication system according to the present embodiment, the number of CIF bits for identifying the cells to which downlink control information corresponds is made bigger than three bits (for example, four bits). By this means, as shown in FIG. 8, it is possible to form the system band by selecting a plurality of cells from Pcell and Scell #1 to Scell #9, and, even when CoMP transmission/reception is executed, it is possible to report information to identify the cells to which downlink control information corresponds, to a user terminal.

Also, by defining new higher layer signaling and combining this with CIF bit information, it is possible to increase the number of bits of the information that identifies the cells to which downlink control information corresponds. In this case, by combining the three-bit CIF and information that is reported by higher layer signaling, even when the number of combinations of cells is large as shown in FIG. 8, it is still possible to report information that identifies the cells to which downlink control information corresponds, to a user terminal.

(Other CoMP Configurations)

Figure 9:
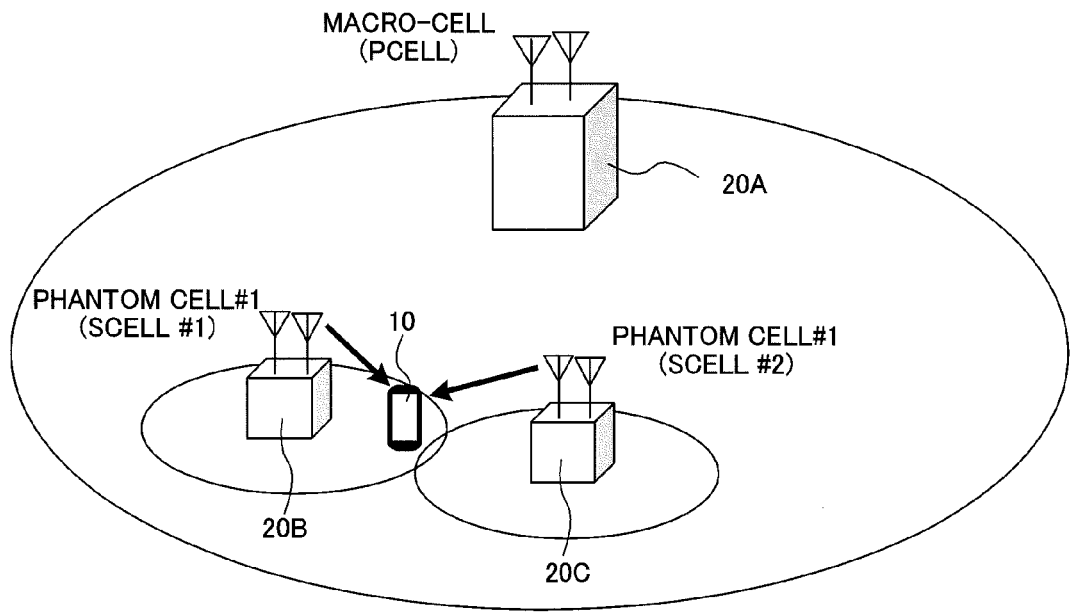
FIG. 9 provides diagrams to show an example of a configuration of a radio communication system according to the present embodiment.

Note that, although, in above FIG. 6 to FIG. 8, cases have been shown where CoMP is applied between the first radio base station apparatus 20A having relatively large transmission power (meaning that the coverage area is wide) and the second radio base station apparatus 20B having relatively low transmission power (meaning that the coverage area is narrow), this is by no means limiting. As shown in FIG. 9, between small cells (phantom cells) formed by the second radio base station apparatuses 20B and 20C having relatively low transmission power, CoMP may be applied in the same frequency, as described above. That is to say, FIG. 9 shows a case where COMP is applied between a plurality of second radio base station apparatuses 20B and 20C which have lower transmission power than the first radio base station apparatus 20A and which have coverage areas that are each included in the coverage area of the first radio base station apparatus 20A.

Also, as shown in FIG. 9, when applying CoMP between radio base station apparatuses having relatively low transmission power, it is necessary to know between which radio base stations amongst a plurality of radio base station apparatuses CoMP should be applied. In this case, it is possible to report information related to the combination of second radio base station apparatuses adopting CoMP (Comp set), in advance, from the first radio base station apparatus 20A (macro base station) to the second radio base station apparatuses having relatively low transmission power. For example, when applying CoMP between the second radio base station apparatuses 20B and 20C, the first radio base station apparatus 20A reports information related to the CoMP set to the second radio base station apparatuses 20B and 20C.

(Configuration of the Radio Communication System)

Now, a radio communication system 1 that is formed with user terminals 10 and radio base station apparatuses 20 will be described below with reference to FIG. 10. The user terminals 10 and the radio base station apparatuses 20 support LTE-A.

Figure 10:
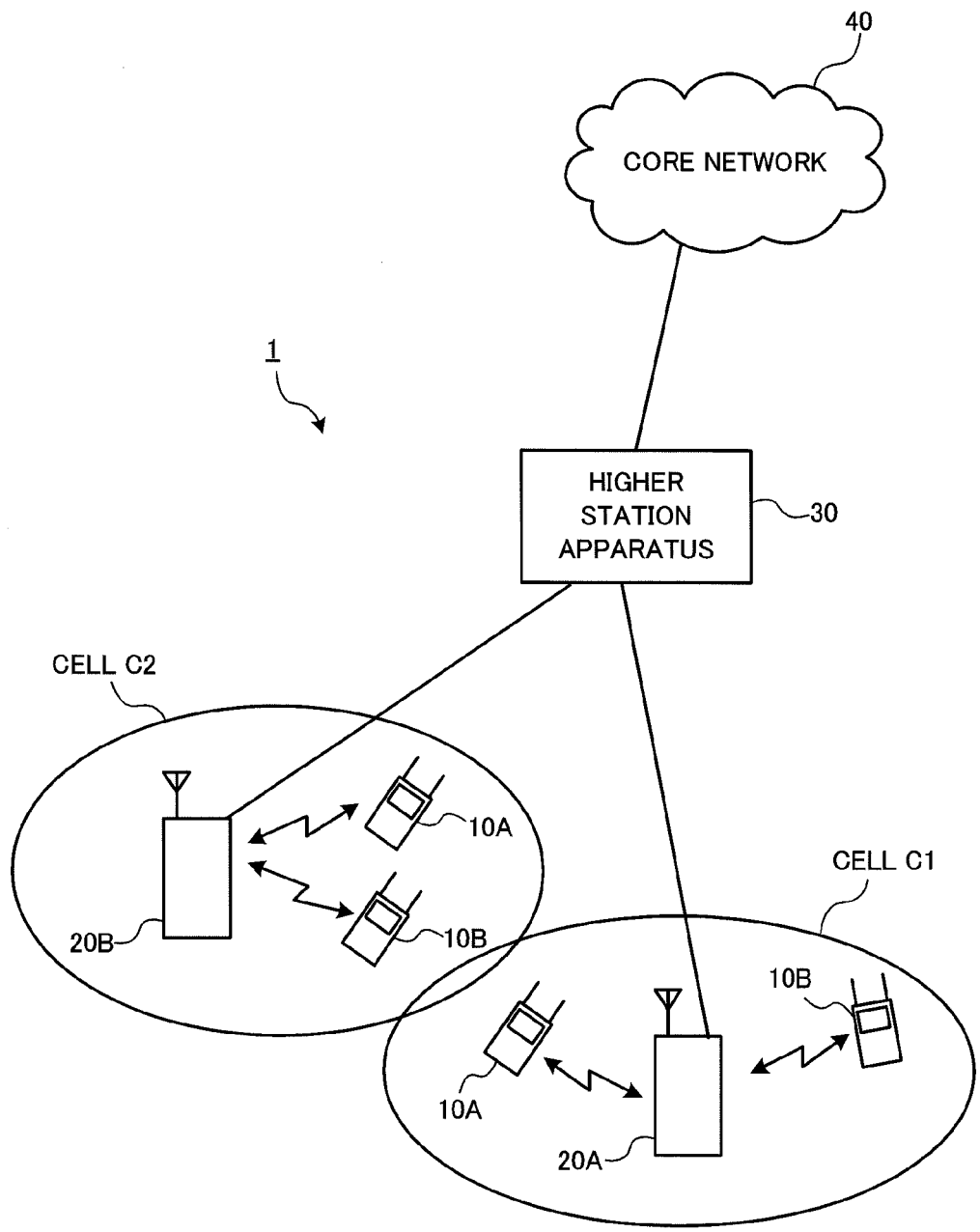
FIG. 10 is a diagram to explain a configuration of a radio communication system according to the present embodiment.

As shown in FIG. 10, the radio communication system 1 is configured to include radio base station apparatuses 20A and 20B and a plurality of user terminals 10A and 10B that communicate with these radio base station apparatuses 20A and 20B. The radio base station apparatuses 20A and 20B are connected with a higher station apparatus 30, and this higher station apparatus 30 is connected with a core network 40. Also, the radio base station apparatuses 20A and 20B are connected with each other by wire connection or by wireless connection. The user terminals 10A and 10B are able to communicate with the radio base station apparatuses 20A and 20B in cells C1 and C2, respectively. Note that the higher station apparatus 30 includes, for example, an access gateway apparatus, a radio network controller (RNC), a mobility management entity (MME) and so on, but is by no means limited to these.

Although the user terminals 10A and 10B may be either LTE terminals or LTE-A terminals, the following description will be given simply with respect to user terminals, unless specified otherwise.

In the radio communication system 1, as radio access schemes, OFDMA (Orthogonal Frequency Division Multiple Access) is applied to the downlink, and SC-FDMA (Single-Carrier Frequency-Division Multiple Access) is applied to the uplink. Note that the uplink radio access scheme is not limited to this. OFDMA is a multi-carrier transmission scheme to perform communication by dividing a frequency band into a plurality of narrow frequency bands (sub carriers) and mapping data to each subcarrier. SC-FDMA is a single carrier transmission scheme to reduce interference between terminals by dividing, per user terminal, the system band into bands formed with one or continuous resource blocks, and allowing a plurality of terminals to use mutually different bands.

Here, communication channel configurations defined in LTE-A will be described. Downlink communication channels include a downlink data channel (PDSCH) that is used by user terminals 10A and 10B on a shared basis, and downlink L1/L2 control channels (including the PDCCH, PCFICH and PHICH). Downlink data and higher control signals are transmitted by the PDSCH. Scheduling information (downlink control information) for the PDSCH and the PUSCH and so on are transmitted by the PDCCH. The number of OFDM symbols to use for the PDCCH is transmitted by the PCFICH (Physical Control Format Indicator Channel). HARQ ACK/NACK for the PUSCH are transmitted by the PHICH (Physical Hybrid-ARQ Indicator Channel).

Uplink communication channels include a PUSCH (Physical Uplink Shared CHannel), which is an uplink data channel to be used by each user terminal on a shared basis, and a PUCCH (Physical Uplink Control CHannel), which is an uplink control channel. By means of this PUSCH, transmission data and higher control information are transmitted. Also, downlink channel quality information (CQI), ACK/NACK and so on are transmitted by the PUCCH.

Figure 11:
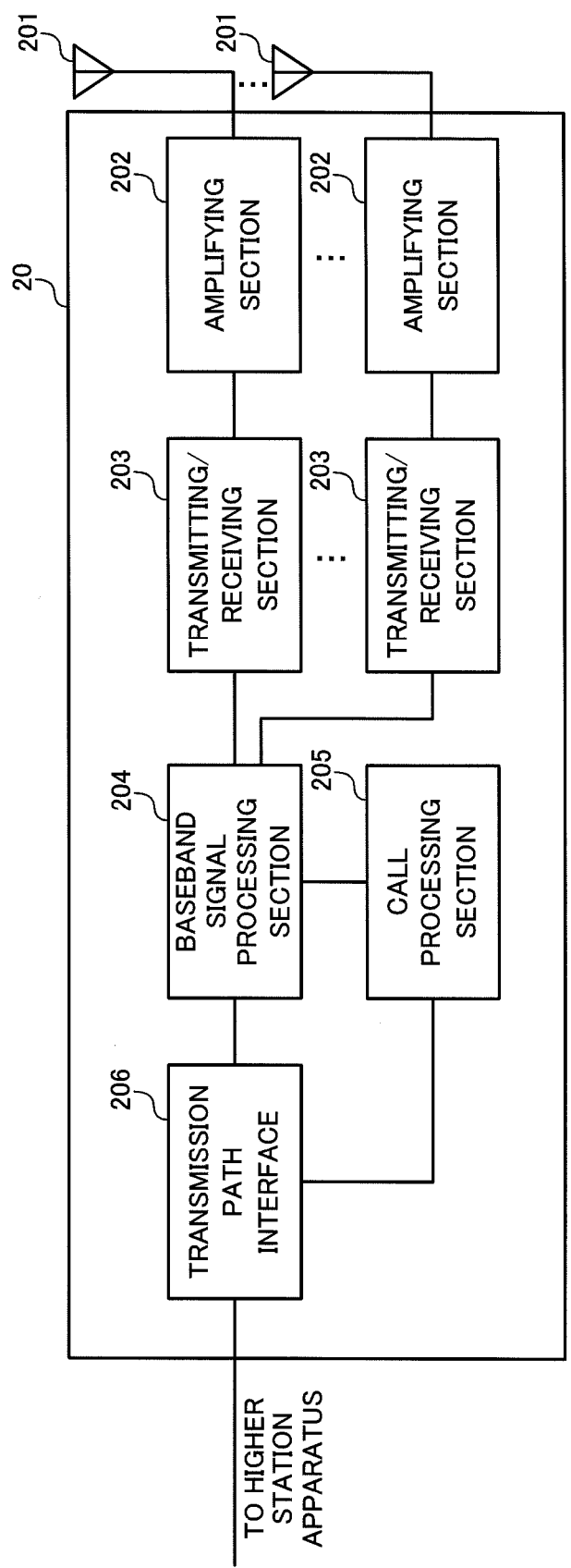
FIG. 11 is a functional block diagram to show an overall configuration of a radio base station apparatus according to the present embodiment.

Referring to FIG. 11, an overall configuration of the radio base station apparatuses 20 according to the present embodiment will be described. Note that the radio base station apparatuses 20A and 20B have the same configuration and therefore hereinafter will be described simply as "radio base station apparatus 20." Also, the user terminals 10A and 10B have the same configuration and therefore hereinafter will be described simply as "user terminal 10."

The radio base station apparatus 20 has a plurality of transmitting/receiving antennas 201, amplifying sections 202, transmitting/receiving sections 203, a baseband signal processing section 204, a call processing section 205 and a transmission path interface 206. Transmission data to be transmitted from the radio base station apparatus 20 to the user terminal 10 on the downlink is input from the higher station apparatus 30, into the baseband signal processing section 204, via the transmission path interface 206.

In the baseband signal processing section 204, a downlink data channel signal is subjected to a PDCP layer process, division and coupling of transmission data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process, and a precoding process. Furthermore, as for the signal of the physical downlink control channel, which is a downlink control channel, transmission processes such as channel coding and an inverse fast Fourier transform are performed.

Also, the baseband signal processing section 204 reports control information for allowing each user terminal 10 to perform radio communication with the radio base station apparatus 20, to the user terminals 10 connected to the same cell, by a broadcast channel. Information for communication in the cell includes, for example, the uplink or downlink system bandwidth, identification information of a root sequence (root sequence index) for generating random access preamble signals in the PRACH, and so on.

The transmitting/receiving sections 203 convert baseband signals, which are subjected to precoding and output from the baseband signal processing section 204 on a per antenna basis, into a radio frequency band. The amplifying sections 202 amplify the radio frequency signals subjected to frequency conversion, and output the results through the transmitting/receiving antennas 201. Note that the transmitting/receiving sections 203 each constitute a receiving section that receives CoMP candidate cell information, and a transmission control section that transmits transmission power information, CoMP cell information, neighboring cell information, and that also executes CoMP transmission of transmission signals.

On the other hand, as for data to be transmitted from the user terminal 10 to the radio base station apparatus 20 on the uplink, radio frequency signals that are received in the transmitting/receiving antennas 201 are each amplified in the amplifying sections 202, converted into baseband signals by frequency conversion in the transmitting/receiving sections 203, and input in the baseband signal processing section 204.

The baseband signal processing section 204 applies, to the transmission data included in the baseband signals received as input, an FFT process, an IDFT process, error correction decoding, a MAC retransmission control receiving process, and RLC layer and PDCP layer receiving processes. The decoded signals are transferred to the higher station apparatus 30 through the transmission path interface 206. The call processing section 205 performs call processes such as setting up and releasing communication channels, manages the state of the radio base station apparatus 20 and manages the radio resources.

Figure 12:
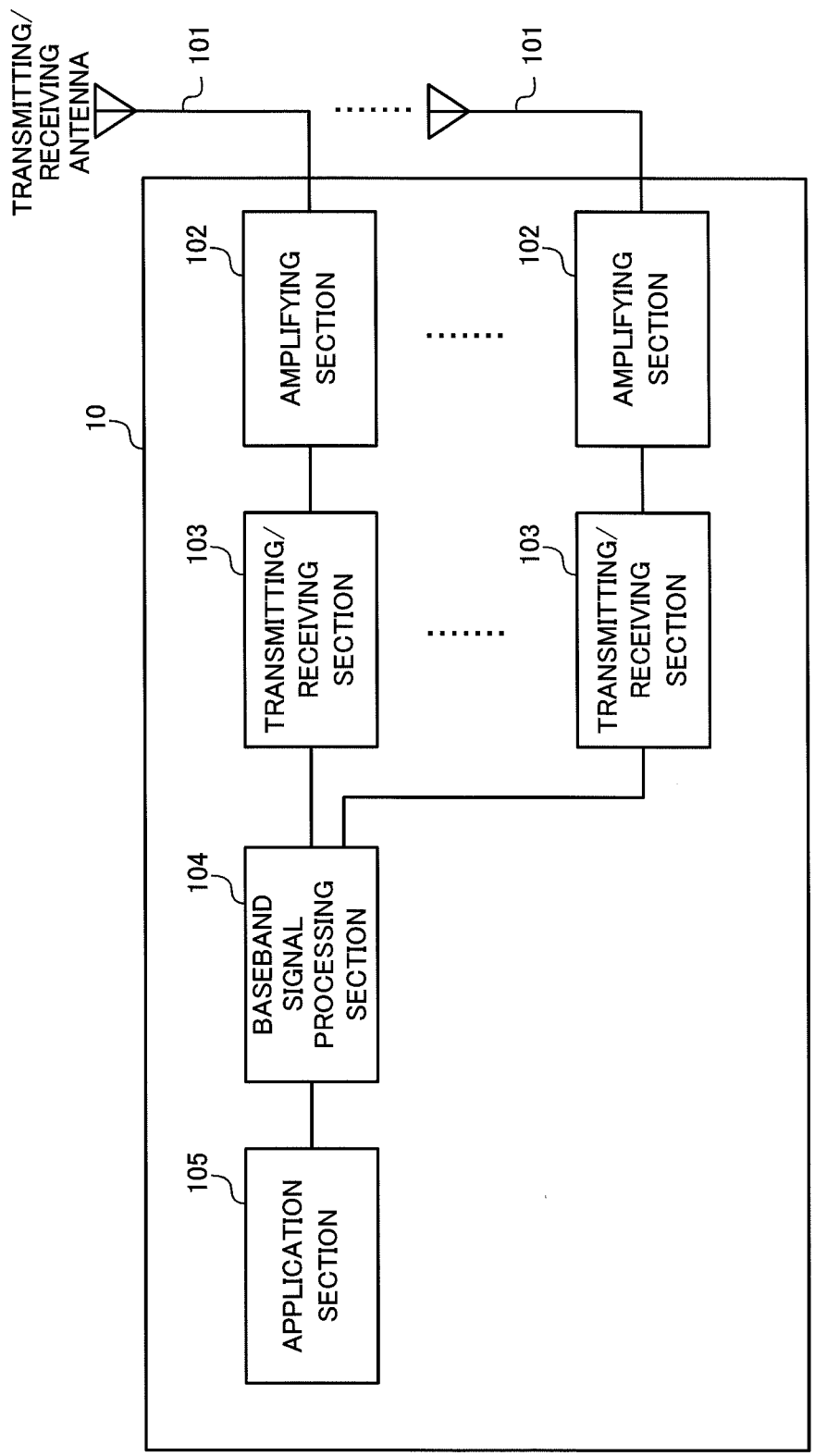
FIG. 12 is a functional block diagram to show an overall configuration of a user terminal according to the present embodiment.

Next, referring to FIG. 12, an overall configuration of a user terminal according to the present embodiment will be described. An LTE terminal and an LTE-A terminal have the same hardware configurations in principle parts, and therefore will be described indiscriminately. The user terminal 10 has a plurality of transmitting/receiving antennas 101, amplifying sections 102, transmitting/receiving sections 103, a baseband signal processing section 104 and an application section 105.

As for downlink data, radio frequency signals that are received in a plurality of transmitting/receiving antennas 101 are amplified in the amplifying sections 102, and subjected to frequency conversion and converted into baseband signals in the transmitting/receiving sections 103. These baseband signals are subjected to receiving processes such as an FFT process, error correction decoding and retransmission control, in the baseband signal processing section 104. In this downlink data, downlink user data is transferred to the application section 105. The application section 105 performs processes related to higher layers above the physical layer and the MAC layer. Also, in the downlink data, broadcast information is also transferred to the application section 105.

Meanwhile, uplink transmission data is input from the application section 105 into the baseband signal processing section 104. The baseband signal processing section 104 performs a mapping process, a retransmission control (HARQ) transmission process, channel coding, a DFT process, and an IFFT process. A baseband signal that is output from the baseband signal processing section 104 is converted into a radio frequency band in the transmitting/receiving sections 103, and, after that, amplified in the amplifying sections 102 and transmitted from the transmitting/receiving antennas 101.

Figure 13:
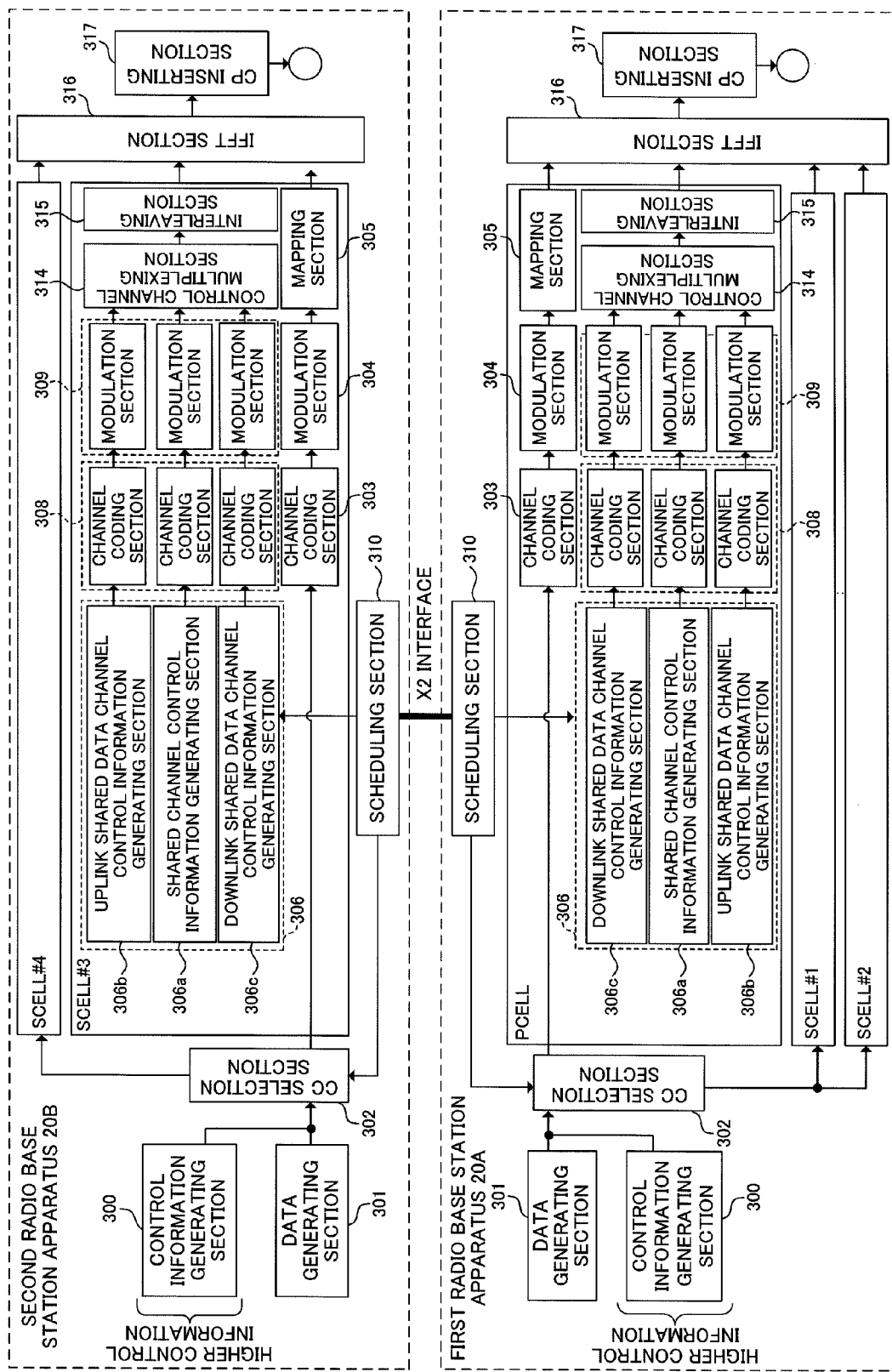
FIG. 13 is a functional block diagram of a baseband processing section provided in a radio base station apparatus according to the present embodiment, and part of higher layers.

FIG. 13 is a functional block diagram of a baseband signal processing section 204 provided in the radio base station apparatus 20 according to the present embodiment and part of the higher layers, and primarily illustrates the function blocks for transmission processes in the baseband signal processing section 204. Transmission data for user terminals 10 under the radio base station apparatus 20 is transferred from the higher station apparatus 30 to the radio base station apparatus 20.

Note that FIG. 13 shows an example of the first radio base station apparatus 20A and the second radio base station apparatus 20B that perform data transmission by an X2 interface. Also, a case in which the first radio base station apparatus 20A uses cells (Pcell, Scell #1 and Scell #2) that respectively correspond to three CCs, and a case in which the second radio base station apparatus 20B uses cells (Scell #3 and Scell #4) that respectively correspond to two CCs, are shown. Obviously, the number of radio base station apparatuses 20 and the number of cells which each radio base station apparatus uses are not limited to these. Also, the first radio base station apparatus 20A and the second radio base station apparatus 20B may have the same configuration.

A control information generating section 300 generates higher control information to report to user terminals by higher layer signaling, in user terminal units. When information about the combinations of cells (for example, Pcell and Scell #3, and/or Scell #1 and Scell #4) to perform coordinated multiple-point transmission is reported to user terminals using higher layer signaling (semi-static signaling), the cell-combination information is generated in the control information generating section 300. Also, in above FIG. 7, when downlink control information is transmitted from one of different cells that transmit the same downlink data, if the cell information in which that downlink control information is allocated is reported to user terminals using higher layer signaling, that information is generated in the control information generating section 300.

The data generating section 301 outputs transmission data transferred from the higher station apparatus 30 as user data, on a per user terminal basis, separately. The component carrier selection section 302 selects component carriers to be used for radio communication with the user terminals 10, on a per user basis. An increase/decrease of component carriers is reported from the radio base station apparatus 20 to the user terminals 10 by higher layer signaling, and a message of completion of application is received from the user terminals 10.

The scheduling section 310 controls the allocation of component carriers to the user terminals 10 under control, according to the overall communication quality of the system band. Also, the scheduling section 310 schedules LTE terminal users and LTE-A terminal users separately. The scheduling section 310 receives as input the transmission data and retransmission commands from the higher station apparatus 30, and also receives as input the channel estimation values and resource block CQIs from the receiving section having measured uplink signals.

Also, the scheduling section 310 schedules the downlink control channel signal and downlink shared channel signal, with reference to the retransmission commands, channel estimation values and CQIs that are received as input. A propagation path in radio communication varies differently per frequency, due to frequency selective fading. So, the scheduling section 310 designates resource blocks (mapping positions) of good communication quality, on a per subframe basis, with respect to the downlink data for each user terminal 10 (which is referred to as "adaptive frequency scheduling"). In adaptive frequency scheduling, a user terminal 10 of good propagation path quality is selected for each resource block. Consequently, the scheduling section 310 designates resource blocks (mapping positions), using the CQI of each resource block, fed back from each user terminal 10.

Likewise, the scheduling section 310 designates resource blocks (mapping positions) of good communication quality, on a per subframe basis, with respect to control information that is transmitted by the PDCCH and so on, by adaptive frequency scheduling. Consequently, the scheduling section 310 designates the resource blocks (mapping positions) using the CQI of each resource block, fed back from each user terminal 10. Also, the MCS (coding rate and modulation scheme) that fulfills a predetermined block error rate with the allocated resource blocks is determined. Parameters that satisfy the MCS (coding rate and modulation scheme) determined by the scheduling section 310 are set in channel coding sections 303 and 308, and modulation sections 304 and 309.

Also, the baseband signal processing section 204 has channel coding sections 303, modulation sections 304, and a mapping section 305 to match the maximum number of users to be multiplexed, N, in one component carrier. The channel coding sections 303 perform channel coding of the shared data channel (PDSCH), formed with downlink data (including part of higher control signals) that is output from the data generating section 301, on a per user basis. The modulation sections 304 modulate user data having been subjected to channel coding, on a per user basis. The mapping section 305 maps the modulated user data to radio resources.

Also, the baseband signal processing section 204 has a downlink control information generating section 306 that generates downlink control information, channel coding sections 308 and modulation sections 309. In the downlink control information generating section 306, an uplink shared data channel control information generating section 306b generates uplink scheduling grants (UL Grants) for controlling the uplink data channel (PUSCH). The uplink scheduling grants are generated on a per user basis.

Also, a downlink shared data channel control information generating section 306c generates downlink scheduling assignments (DL assignments) for controlling the downlink data channel (PDSCH). The downlink scheduling assignments are generated on a per user basis. Also, a shared channel control information generating section 306a generates shared control channel control information, which is downlink control information that is common between users.

When information about the combinations of cells (for example, Pcell and Scell #3, and/or Scell #1 and Scell #4) to execute coordinated multiple-point transmission is included in downlink control information and reported to user terminals (dynamic signaling), the cell-combination information is generated in the downlink control information generating section 306. To be more specific, when cell-combination information is included in a DL assignment, the cell-combination information is generated in the downlink shared data channel control information generating section 306c. Also, when cell-combination information is included in an UL grant, the cell-combination information is generated in the uplink shared data channel control information generating section 306b.

Also, in above FIG. 7, when transmitting downlink control information from one of different cells that transmit the same downlink data, the cell information in which the downlink control information is allocated is included in the downlink control information and transmitted to user terminals, that information is generated in the downlink control information generating section 306.

Note that when transmitting downlink control information for a plurality of cells from a predetermined cell (Pcell), it is possible to adopt a configuration to generate downlink control information for other cells in the downlink control information generating section 306.

Control information that is modulated on a per user basis in the modulation sections 309 is multiplexed in the control channel multiplexing section 314 and furthermore interleaved in an interleaving section 315. A control signal that is output from the interleaving section 315 and user data that is output from the mapping section 305 are input in an IFFT section 316 as a downlink channel signal. Also, a downlink reference signal is input in the IFFT section 316. The IFFT section 316 converts the downlink channel signal and the downlink reference signal from a frequency domain signal into time sequence signals by performing an inverse fast Fourier transform. A cyclic prefix insertion section 317 inserts cyclic prefixes in the time sequence signal of the downlink channel signal. Note that a cyclic prefix functions as a guard interval for cancelling the differences in multipath propagation delay. The transmission data, to which cyclic prefixes have been added, is transmitted to the transmitting/receiving sections 203.

Note that although FIG. 13 shows the configuration shown in above FIG. 2B (autonomous distributed control based on an independent base station configuration) as the first radio base station apparatus 20A and the second radio base station apparatus 20B, obviously, it is equally possible to use the configuration shown in above FIG. 2A (centralized control based on remote radio equipment configuration) for the present embodiment. For example, it is possible to make the first radio base station apparatus 20A be a radio base station apparatus eNB and make the second radio base station apparatus 20B be remote radio equipment (RRE). In this case, referring to FIG. 13, it is also possible to provide a configuration in which, without providing a scheduling section 310 and so on in the second radio base station apparatus 20B, data transmission of the first radio base station apparatus 20A and the second radio base station apparatus 20B is controlled in the scheduling section 310 of the first radio base station apparatus 20A.

Figure 14:
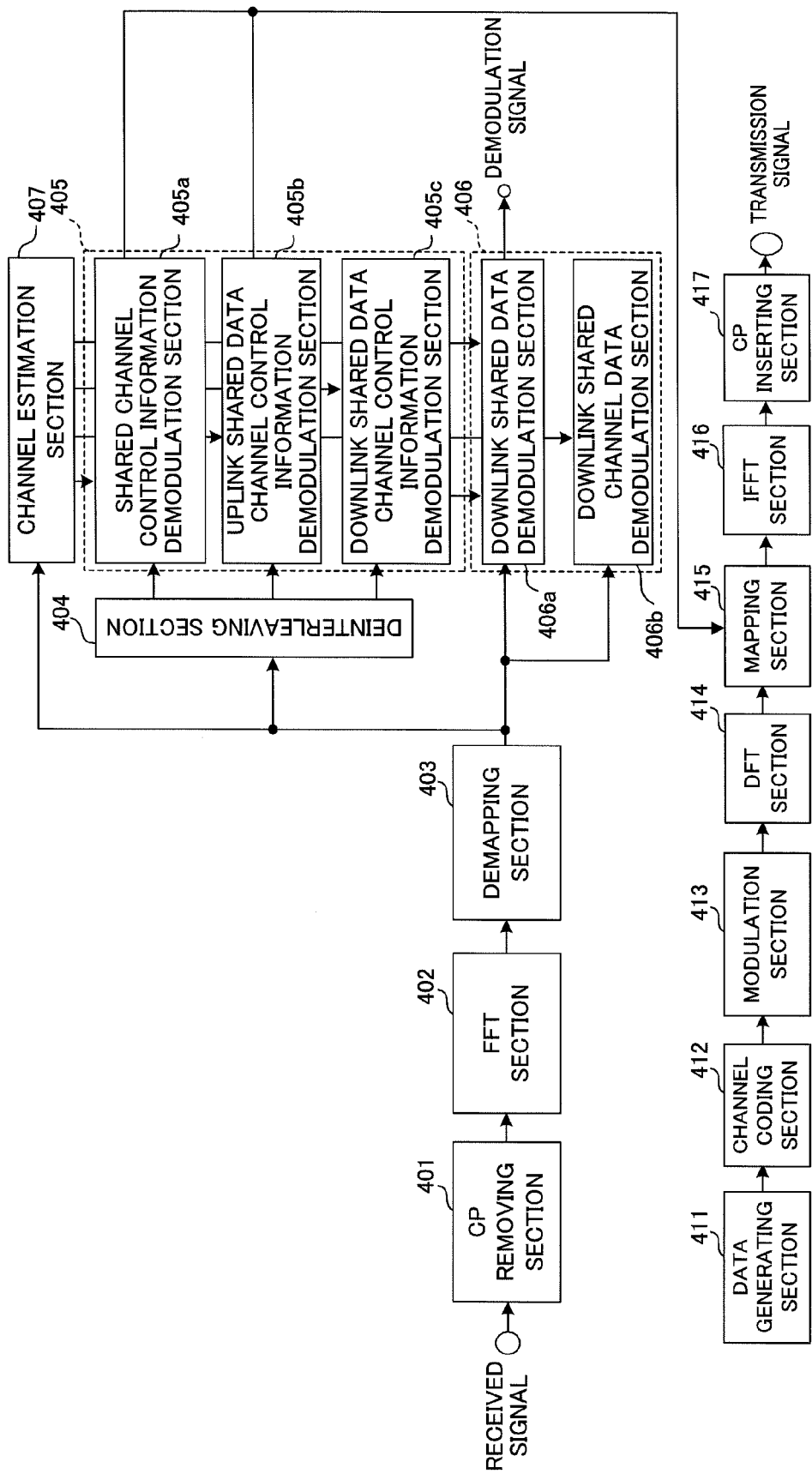
FIG. 14 is a functional block diagram of a baseband processing section provided in a user terminal according to the present embodiment.

FIG. 14 is a functional block diagram of a baseband signal processing section 104 provided in a user terminal 10, illustrating function blocks of an LTE-A terminal which supports LTE-A.

A downlink signal that is received as received data from the radio base station apparatus 20 has the CPs removed in a CP removing section 401. The downlink signal, from which the CPs have been removed, is input in an FFT section 402. The FFT section 402 performs a fast Fourier transform (FFT) on the downlink signal, converts the time domain signal into a frequency domain signal and inputs this signal in a demapping section 403. The demapping section 403 demaps the downlink signal, and extracts, from the downlink signal, multiplex control information in which a plurality of pieces of control information are multiplexed, user data and higher control signals. Note that the demapping process by the demapping section 403 is performed based on higher control signals that are received as input from the application section 105. The multiplex control information output from the demapping section 403 is deinterleaved in a deinterleaving section 404.

Also, the baseband signal processing section 104 has a downlink control information demodulation section 405 that demodulates downlink control information, a data demodulation section 406 that demodulates downlink shared data, and a channel estimation section 407. The downlink control information demodulation section 405 has a shared channel control information demodulation section 405a that demodulates downlink shared control channel control information from multiplex control information, an uplink shared data channel control information demodulation section 405b that demodulates uplink shared data channel control information from multiplex control information, and a downlink shared data channel control information demodulation section 405c that demodulates downlink shared data channel control information from multiplex control information.

The shared channel control information demodulation section 405a extracts shared control channel control information, which is control information that is common between users, by the blind decoding process, demodulation process, channel decoding process and so on of the common search space of the downlink control channel (PDCCH). The shared control channel control information includes downlink channel quality information (CQI), and therefore is input in a mapping section 415 and mapped as part of transmission data for the radio base station apparatus 20.

The uplink shared data channel control information demodulation section 405b extracts uplink shared data channel control information (for example, the UL grant) by the blind decoding process, demodulation process, channel decoding process and so on of the user-specific search space of the downlink control channel (PDCCH). The demodulated uplink shared data channel control information is input in the mapping section 415 and is used to control the uplink shared data channel (PUSCH).

The downlink shared data channel control information demodulation section 405c extracts user-specific downlink shared data channel control information (for example, DL assignment) by the blind decoding process, demodulation process, channel decoding process and so on of the user-specific search space of the downlink control channel (PDCCH). The demodulated downlink shared data channel control information is input in the data demodulation section 406, is used to control the downlink shared data channel (PDSCH), and is input in the downlink shared data demodulation section 406a.

Also, when information about the combinations of cells that perform coordinated multiple-point transmission is included in downlink control information and reported to user terminals (dynamic signaling), the downlink control information demodulation section 405 functions as a determining section to demodulate downlink control information and determine the combinations of cells to perform coordinated multiple-point transmission. Likewise, in above FIG. 7, when transmitting downlink control information from one of different cells that transmit the same downlink data, if the cell information in which the downlink control information is allocated is included in the downlink control information and transmitted to user terminals, the downlink control information demodulation section 405 functions as a determining section to demodulate the received downlink control information and determine the cell where the downlink control signal to use to demodulate the downlink data is allocated.

When these pieces of information are included in a DL assignment, these pieces of information are demodulated in the downlink shared data channel control information demodulation section 405c, and, when these pieces of information are included in a UL grant, these pieces of information are demodulated in the uplink shared data channel control information demodulation section 405b.

The data demodulation section 406 includes a downlink shared data demodulation section 406a that demodulates user data and higher control signals, and a downlink shared channel data demodulation section 406b that demodulates downlink shared channel data.

The downlink shared data demodulation section 406a acquires the user data, higher control information and so on, based on the downlink shared data channel control information that is received as input from the downlink shared data channel control information demodulation section 405c. The downlink shared channel data demodulation section 406b demodulates the downlink shared channel data based on the uplink shared data channel control information that is received as input from the uplink shared data channel control information demodulation section 405b.

Also, when information about the combinations of cells that execute coordinated multiple-point transmission is reported to user terminals using higher layer signaling (semi-static signaling), the downlink shared data demodulation section 406a functions as a determining section to determine the combinations of cells to perform coordinated multiple-point transmission. Likewise, referring to above FIG. 7, when transmitting downlink control information from one of different cells that transmit the same downlink data, if the cell information in which the downlink control information is allocated is reported to user terminals using higher layer signaling, the downlink shared data demodulation section 406a functions as a determining section to determine the cell where the downlink control signal to use to demodulate the downlink data is allocated.

The channel estimation section 407 performs channel estimation using user-specific reference signals (DM-RSs) or cell-specific reference signals (CRSs). The estimated channel variation is output to the shared channel control information demodulation section 405a, the uplink shared data channel control information demodulation section 405b, the downlink shared data channel control information demodulation section 405c and the downlink shared data demodulation section 406a. In these demodulation sections, the demodulation process is performed using the estimated channel variation and the reference signals for demodulation.

Also, the baseband signal processing section 104 has, as function blocks of the transmission processing system, a data generating section 411, a channel coding section 412, a modulation section 413, a DFT section 414, a mapping section 415, an IFFT section 416 and a CP insertion section 417. The data generating section 411 generates transmission data from bit data that is received as input from the application section 105. The channel coding section 412 applies channel coding processes such as error correction to transmission data, and the modulation section 413 modulates the transmission data after channel coding by QPSK and so on.

The DFT section 414 performs a discrete Fourier transform on the modulated transmission data. The mapping section 415 maps the frequency components of the data symbol after the DFT to subcarrier positions designated by the radio base station apparatus 20. The IFFT section 416 converts the input data to match the system band into time to sequence data by performing an inverse fast Fourier transform, and the CP insertion section 417 inserts cyclic prefixes in the time sequence data per data division.

Now, although the present invention has been described in detail with reference to the above embodiments, it should be obvious to a person skilled in the art that the present invention is by no means limited to the embodiments described herein. The present invention can be implemented with various corrections and in various modifications, without departing from the spirit and scope of the present invention defined by the recitations of the claims. Consequently, the descriptions herein are provided only for the purpose of explaining examples, and should by no means be construed to limit the present invention in any way.

The disclosure of Japanese Patent Application No. 2011-167567, filed on Jul. 29, 2011, including the specification, drawings and abstract, is incorporated herein by reference in its entirety.

The invention claimed is:

1. A radio communication system comprising:
a first radio base station apparatus that transmits downlink data to a user terminal using a plurality of cells that respectively correspond to fundamental frequency blocks of varying frequency bands; and
a second radio base station apparatus that transmits downlink data to the user terminal using a cell that corresponds to fundamental frequency block of a same frequency band as one of the plurality of cells, wherein:
the user terminal receives the downlink data in a system band that is formed with cells that are selected respectively from the first radio base station apparatus and the second radio base station apparatus;
the first radio base station apparatus and the second radio base station apparatus perform coordinated multiple-point transmission for the user terminal, between the cells corresponding to a same fundamental frequency block;
the first radio base station apparatus and/or the second radio base station apparatus report information about a combination of cells that perform the coordinated multiple-point transmission to the user terminal;
the first radio base station apparatus and/or the second radio base station apparatus transmit downlink control information to control downlink data that is transmitted from a cell that performs the coordinated multiple-point transmission, using a downlink control channel of a predetermined cell; and
the user terminal identifies the cell where the downlink data is allocated by combination of a bit field of the downlink control information and higher layer signaling.

2. The radio communication system according to claim 1, wherein the information about the combination of cells is included in downlink control information to control demodulation of the downlink data, and reported to the user terminal.

3. The radio communication system according to claim 1, wherein the information about the combination of cells is included in higher layer signaling and reported to the user terminal.

4. The radio communication system according to claim 1, wherein, when the first radio base station apparatus and the second radio base station apparatus transmit the same downlink data to the user terminal from the cells corresponding to the same fundamental frequency block, downlink control information to demodulate the same downlink data is transmitted from one of the cells.

5. The radio communication system according to claim 4, wherein information about a cell where downlink control information to demodulate the same downlink data is allocated is included in a downlink control signal or higher layer signaling and reported to the user terminal.

6. The radio communication system according to claim 1, wherein the first radio base station apparatus is a macro base station having a relatively large coverage area and the second radio base station apparatus is a micro base station having a relatively narrow coverage area.

7. The radio communication system according to claim 6, wherein the coverage area of the first radio base station apparatus partly overlaps the coverage area of the second radio base station apparatus or includes the coverage area of the second radio base station apparatus.

8. A radio communication system comprising:
a first radio base station apparatus that transmits downlink data to a user terminal using a plurality of cells that respectively correspond to fundamental frequency blocks of varying frequency bands; and
a plurality of second radio base station apparatuses that have lower transmission power than the first radio base station apparatus and that also have coverage areas that are each included in a coverage area of the first radio base station apparatus, wherein:
the plurality of the second radio base station apparatuses transmit downlink data to the user terminal by performing coordinated multiple-point transmission using cells that correspond to fundamental frequency blocks of a same frequency band;
the user terminal receives the downlink data transmitted from the plurality of the second radio base station apparatuses by coordinated multiple-point transmission;
the first radio base station apparatus and/or the second radio base station apparatuses report information about a combination of cells that perform the coordinated multiple point transmission to the user terminal;
the first radio base station apparatus and/or the second radio base station apparatuses transmit downlink control information to control downlink data that is transmitted from a cell that performs the coordinated multiple-point transmission, using a downlink control channel of a predetermined cell; and
the user terminal identifies the cell where the downlink data is allocated by combination of a bit field of the downlink control information and higher layer signaling.

9. A radio communication method comprising the steps of:
at a first radio base station apparatus, transmitting downlink data to a user terminal using a plurality of cells that respectively correspond to fundamental frequency blocks of varying frequency bands;
at a second radio base station apparatus, transmitting downlink data to the user terminal using a cell that corresponds to fundamental frequency block of a same frequency band as one of the plurality of cells; and
at the user terminal, receiving the downlink data in a system band that is formed with cells that are selected respectively from the first radio base station apparatus and the second radio base station apparatus,
wherein the first radio base station apparatus and the second radio base station apparatus perform coordinated multiple-point transmission for the user terminal, between cells corresponding to a same fundamental frequency block;
the first radio base station apparatus and/or the second radio base station apparatus report information about a combination of cells that perform the coordinated multiple-point transmission to the user terminal;
the first radio base station apparatus and/or the second radio base station apparatus transmit downlink control information to control downlink data that is transmitted from a cell that performs the coordinated multiple-point transmission, using a downlink control channel of a predetermined cell; and
the user terminal identifies the cell where the downlink data is allocated by combination of a bit field of the downlink control information and higher layer signaling.

10. A radio base station apparatus that transmits downlink data to a user terminal using a plurality of cells that respectively correspond to fundamental frequency blocks of varying frequency bands, the radio base station apparatus comprising:
a transmission control section configured to execute coordinated multiple-point transmission with the user terminal, between a predetermined cell selected from the plurality of cells, and a cell of another radio base station apparatus corresponding to a fundamental frequency block of a same frequency band as the predetermined cell; and
an information generating section configured to generate information about a combination of cells that perform the coordinated multiple-point transmission,
wherein the information generating section generates downlink control information to control downlink data that is transmitted from a cell that performs the coordinated multiple-point transmission, using a downlink control channel of a predetermined cell; and
the user terminal identifies the cell where the downlink data is allocated by combination of a bit field of the downlink control information and higher layer signaling.

11. A user terminal that receives data transmitted from a plurality of radio base station apparatuses using a system band that is forming with a plurality of fundamental frequency blocks, the user terminal comprising:
a reception control section configured to receive downlink data that is transmitted from a plurality of radio base station apparatuses by coordinated multiple-point transmission between cells corresponding to fundamental frequency blocks of a same frequency band; and
a determining section configured to demodulate the data transmitted from the plurality of radio base station apparatuses and determine a combination of cells that perform the coordinated multiple-point transmission,
wherein the reception control section receives downlink control information to control downlink data that is transmitted from a cell that performs the coordinated multiple-point transmission, using a downlink control channel of a predetermined cell; and
the determining section identifies the cell where the downlink data is allocated by combination of a bit field of the downlink control information and higher layer signaling.

* * * * *